US012631737B2

(12) United States Patent
Vargas et al.

(10) Patent No.: US 12,631,737 B2
(45) Date of Patent: May 19, 2026

(54) ULTRA-WIDEBAND STROBE BEACON

(71) Applicant: INFINITE PERIPHERALS, INC., Irvine, CA (US)

(72) Inventors: John Vargas, Downey, CA (US); Jeffrey Scott, Irvine, CA (US)

(73) Assignee: INFINITE PERIPHERALS, INC., Irvine, CA (US)

( * ) Notice: Subject to any disclaimer, the term of this patent is extended or adjusted under 35 U.S.C. 154(b) by 319 days.

(21) Appl. No.: 18/386,878

(22) Filed: Nov. 3, 2023

(65) Prior Publication Data

US 2025/0147162 A1     May 8, 2025

(51) Int. Cl.
   *G01S 11/02*       (2010.01)
   *H04W 64/00*      (2009.01)

(52) U.S. Cl.
   CPC ........... *G01S 11/02* (2013.01); *H04W 64/006* (2013.01)

(58) Field of Classification Search
   CPC .............................. G01S 11/02; H04W 64/006
   See application file for complete search history.

(56) References Cited

U.S. PATENT DOCUMENTS

| | | | |
|---|---|---|---|
| 2015/0263791 A1 | 9/2015 | Chein | |
| 2018/0330560 A1* | 11/2018 | Hiramine | G07C 9/00309 |
| 2020/0043300 A1* | 2/2020 | Grom | G08B 5/38 |
| 2020/0264708 A1* | 8/2020 | Strahle | G06F 3/033 |
| 2021/0200272 A1* | 7/2021 | Norton, Jr. | C08L 101/14 |
| 2021/0266710 A1 | 8/2021 | Martin et al. | |
| 2021/0274315 A1* | 9/2021 | Daoura | H04W 4/38 |
| 2021/0400440 A1* | 12/2021 | Tzirimis | H04W 4/029 |
| 2023/0078485 A1 | 3/2023 | Russell et al. | |
| 2023/0230462 A1* | 7/2023 | Lum | G08B 5/36 |
| | | | 362/85 |

OTHER PUBLICATIONS

International Search Report and Written Opinion directed to related International Application No. PCT/US2024/054350, mailed Jan. 16, 2025; 17 pages.

* cited by examiner

*Primary Examiner* — Myron Wyche

(74) *Attorney, Agent, or Firm* — Sterne, Kessler, Goldstein & Fox P.L.L.C.

(57) ABSTRACT

Disclosed herein are device, method, and computer program product embodiments for tracking the location of a device and corresponding tracked object and visually broadcasting their location. A device may transmit a signal via ultra-wideband, when moving, or Bluetooth low energy, when stationary, communication protocols to a mobile computing device. The signal can be used to triangulate the location of the device. The determined location information allows a device management system to track the location of devices and objects in a tracking environment. The device may receive instruction from the mobile computing device and/or device management system to illuminate and visually broadcast the location of the device and tracked object. The combination of the location and visual broadcast may allow a user to easily identify the device and tracked object in an environment with multiple tracked objects and location data alone may be insufficient for efficient identification.

20 Claims, 6 Drawing Sheets

400

200

300A

300B

330

380.1

300B 380.2

385

300B

390

395

114

395

395

400

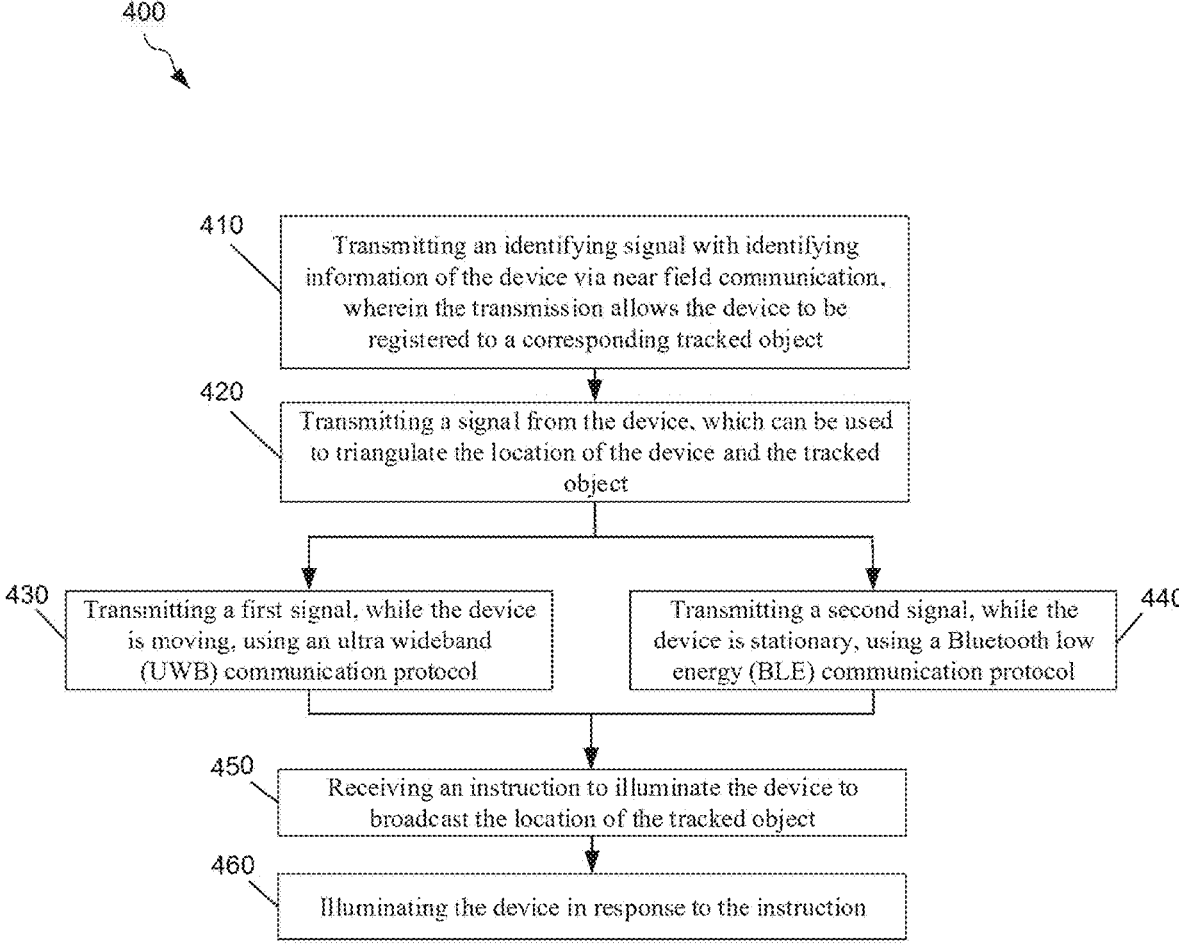

410
Transmitting an identifying signal with identifying information of the device via near field communication, wherein the transmission allows the device to be registered to a corresponding tracked object 420
Transmitting a signal from the device, which can be used to triangulate the location of the device and the tracked object 430
Transmitting a first signal, while the device is moving, using an ultra wideband (UWB) communication protocol 440
Transmitting a second signal, while the device is stationary, using a Bluetooth low energy (BLE) communication protocol 450
Receiving an instruction to illuminate the device to broadcast the location of the tracked object 460
Illuminating the device in response to the instruction

FIG. 4

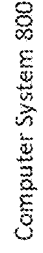
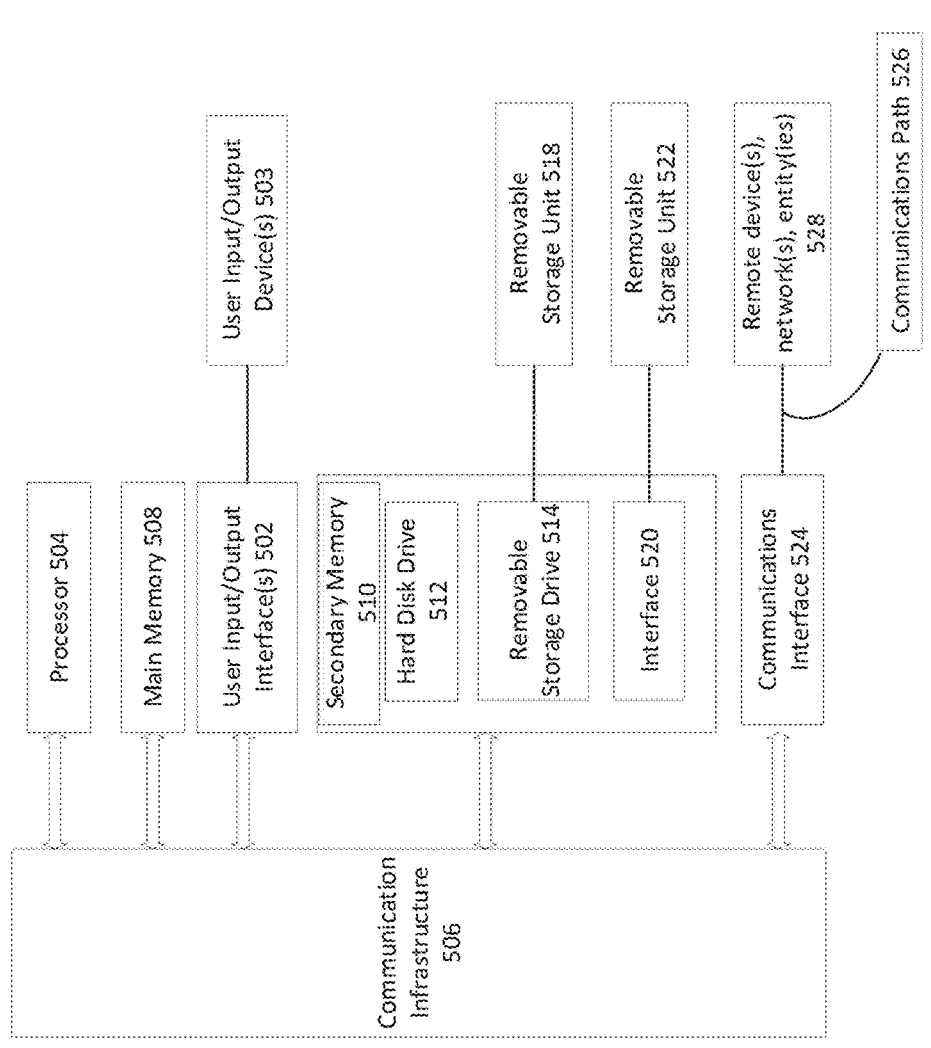
FIG. 5

ULTRA-WIDEBAND STROBE BEACON

BACKGROUND

Field

This field is generally related to using locating tagged objects within a shipping, manufacturing, and/or storage environments.

Related Art

Device location tracking continues to evolve with technology and allow for more precise location tracking. One issue that may persist is that location tracking may be precise, but not allow for quick identification of a single tracked object that be in a location around multiple other tracked objects or may not be visually distinguishable from other tracked objects. Especially in industrial settings such as shipping, manufacturing, and storage location that may place objects directly on top of one another for storage and/or have objects stored in identical containers. Currently, there is no device providing location based tracking in combination with visually broadcasting the location of the device and tracked object to the user to quickly and easily identify objects using a proximate location and visual broadcast.

BRIEF SUMMARY

Disclosed herein are system, apparatus, device, method and/or computer program product embodiments, and/or combinations and sub-combinations thereof, for visual and location based tracking of tagged objects within a shipping or manufacturing environment.

In an embodiment, a device transmits a signal containing identifying information to a mobile computing device. In the embodiment, the device is placed on a tracked object and the device and tracked object are moved to a location. While moving the device transmits a signal to a mobile computing device using an ultra-wideband (UWB) communication protocol. The mobile computing device using the location data associated with its position, acts as an anchor to determine the location and direction of the device relative to the mobile computing device. When stationary, the device transmits the signal using a Bluetooth low energy (BLE) communication protocol which allows the mobile computing device to approximate the distance of the device from the mobile computing device. The device may also use the BLE connection to receive instructions to illuminate, visually broadcasting the location of the device and or provide an audible indication of the location of the device.

Further embodiments, features, and advantages of the invention, as well as the structure and operation of the various embodiments, are described in detail below with reference to accompanying drawings

BRIEF DESCRIPTION OF THE DRAWINGS

The accompanying drawings are incorporated herein and form a part of the specification.

FIG. 4 depicts a flowchart illustrating a method for transmitting the location of the device while moving and stationary and receiving an instruction to illuminate the device and visually broadcast the location of the device, according to some embodiments.

FIG. 5 depicts an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for tracking the location of a device and tracked object and visually broadcasting the location of the device and corresponding tracked object.

Various embodiments of these features will now be discussed with respect to the corresponding figures.

Figure 1:
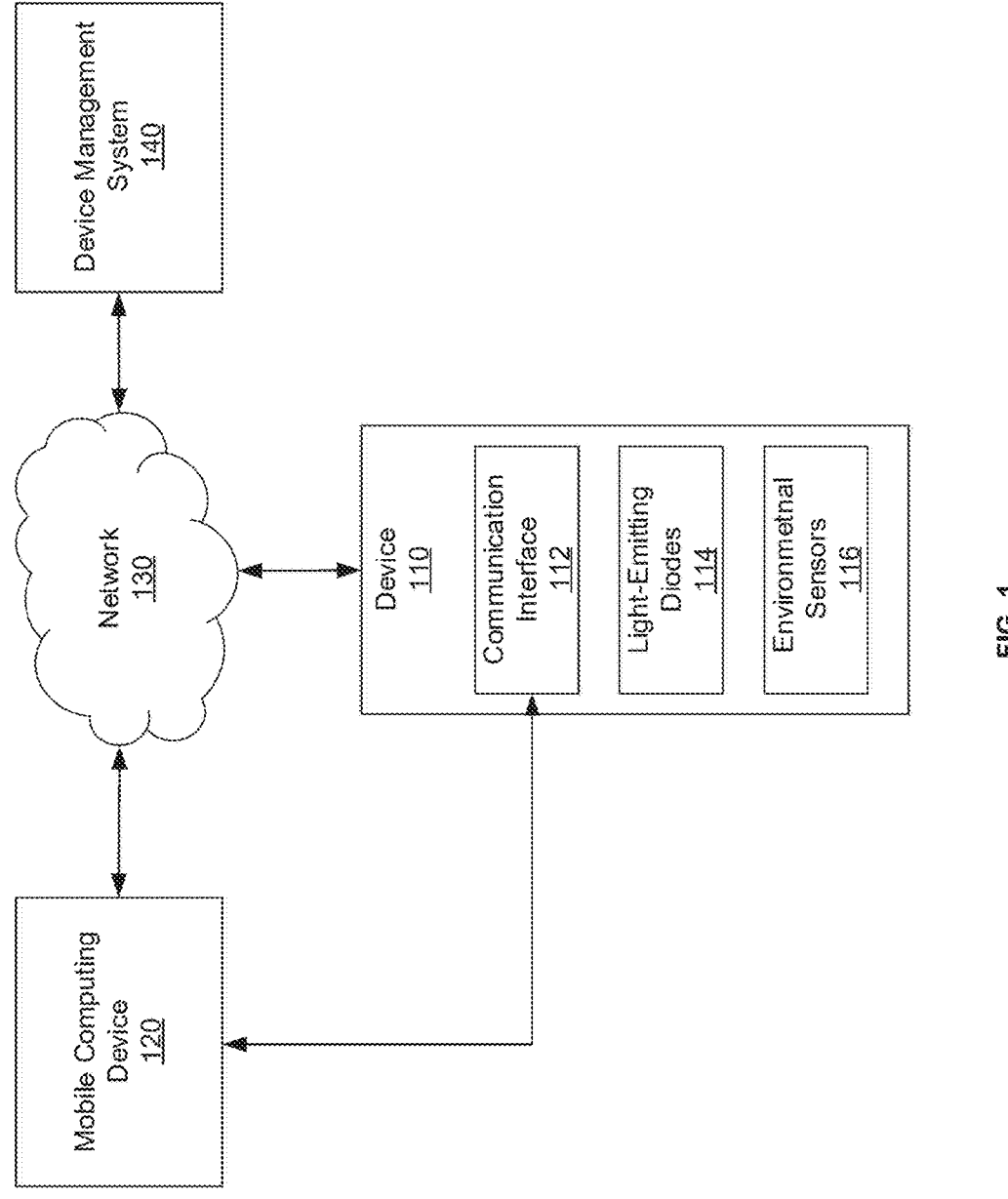
FIG. 1 depicts a block diagram of a tracking environment, according to some embodiments.

FIG. 1 depicts a block diagram of a device for visual and location based tracking of a tagged object in a shipping, manufacturing, and/or storage environments, according to some embodiments. Shipping and/or manufacturing environment 100 includes device 110, mobile computing device 120, network 130, and device management system 140.

Tracking environment 100 may be a shipping, manufacturing, storage environment, and/or environments utilizing tracking systems for tagged objects which are otherwise difficult to locate and identify without a tracking system. In tracking environment 100, device 110 may be a beacon ruggedized for industrial practices, such as protection from environment and impact factors. Device 110 may include communication interface 112, light-emitting diodes (LEDs) 114, and environmental sensors 116. Communication interface 112 may capable of communicating with mobile computing device 120. Mobile computing device 120 and device management system 140 may be or utilize a computer system such as a computer system 800 described with reference to FIG. 5. For example, mobile computing device 120 may be a smart phone, smart watch, laptop or notebook computer, netbook, tablet, personal digital assistant (PDA), and/or other mobile communication devices which are wearable or portable. Device management system 140 may communicate with mobile computing device 120 via network 130.

In some embodiments, device 110 may initially be activated and registered in device management system 140. Once device 110 has been activated and registered in device managements system 140, device 110 may be associated with an object. Device 110 may be immediately placed on the tracked object, if the tracked object in within the physical location of tracking environment 100. In some embodiments, the tracked object may later enter the physical location of environment 100. For example, when tracking environment 100 is a storage environment, the tracked objects may be available within the storage physical storage location and device 110 may be immediately placed on the tracked object and registered to the tracked object in device management system 140. In some embodiments, such as when tracking environment 100 is a shipping and storage environment, the tracked object may arrive at the physical storage location and device 110 may be placed on the tracked object once the tracked object has arrived at the physical storage location.

In some embodiments, tracking environment 100 may be a manufacturing environment. For example, a manufacturing environment for vehicle production, such as a manufacturing plant. The tracked object may be a portion, or portions, of the vehicle as it moves through the manufacturing process. Device 110 may be attached to track the location of the vehicle, or portion of the vehicle, being manufactured. Additionally, knowing the location of device 110 attached to a portion of the vehicle allows device management system 140 to track information about the location of the object throughout the manufacturing process. Device management system 140 may track and store this data for analysis (e.g. manufacturing or production efficiency) or transmit the data to another analysis application. The manufacturing environment is described with reference to vehicle manufacturing and production, but is not limited to this environment and may be applicable to other types of manufacturing and/or production environments.

Communication interface 112 facilitate communication of data from device 110 to mobile computing device 120, and/or device management 140. Data communicated from communication interface 112 may be identification information of device 110 and the tracked object associated with device 110. The transmitted signal may be used by the mobile computing device to determine the ID of device 110 when there are a plurality of devices. In some embodiments, the signal may be an RF signal. Communication interface 112 may allow device 110 to receive instruction from mobile computing device 120 regarding operation of LEDs 114. This may occur as direct wireless communications between the device 110, mobile computing device 120, device management system 140, and/or may occur via network 130.

Communication interface 112 may use a communication protocol (e.g., Ultra-wideband (UWB), Wi-Fi Direct, peer-to-peer Wi-Fi, Nearby Share, Multipeer Connectivity, infrared, etc.) to facilitate a peer-to-peer, ad hoc, and high-speed network) to facilitate communication between device 110 and mobile computing device 120. For example, prior to being placed on the tracked object, communication interface 112 may use near-field communication (NFC) or a "tap-to-pair" function to initiate communication between device 110 and mobile computing device 120. Mobile computing device 120 may send the identifying information for device 110 to device management system 140. Device management system 140 may register device 110 to the tracked object.

In some embodiments, communication interface 112 may use a multitude of communication protocols. For example, device 110 may use both Bluetooth low energy (BLE) and ultra-wideband communication protocols (UWB) to transmit a signal that may be received at mobile computing device 120. Mobile computing device 120 may use its own location data and the received signal to determine the location and/or direction of device 110. UWB is a short-range, low-power, high-precision wireless technology that uses radio waves to measure the distance and direction between two devices. UWB can provide more accurate and granular location information than Bluetooth, especially indoors or in complex environments where GPS signals may be weak or unavailable. Bluetooth is a longer-range, low-energy, widely-used wireless technology that uses radio waves to connect devices and exchange data. Bluetooth can provide approximate location information based on the signal strength and proximity of nearby devices, as well as enable features such as sound alerts and pairing.

In some embodiments, both UWB and BLE communication protocols may be used by communication interface 112 to transmit a signal from device 110 and the tracked object to mobile computing device 120 and vice versa.

For example, if device 110 is within the Bluetooth range of mobile computing device 110 (up to approximately 30 meters), an app on mobile computing device 120 can show the approximate distance and direction to device 110 using Bluetooth signals. If mobile computing device 120 is within UWB range of device 110, an app on mobile computing device 120 can also use UWB signals to provide a more precise location.

If device 110 is out of the Bluetooth range of the mobile computing device 120, it can still use Bluetooth and/or UWB to communicate with other mobile computing devices nearby. These mobile computing devices can detect the Bluetooth and/or UWB signal from device 110 and relay its location to mobile computing device 120 through an encrypted and anonymous process that protects the privacy and security of all parties involved. Mobile computing device 120 can present the last known location of the device 110 on a map in an app, and receive a notification if device 110 is found by the network.

In some embodiments, while device 110 is stationary and communication interface 112 is using the BLE communication protocol, device 110 is in low power mode. Low power mode may mean communication interface 112 may intermittently transmit a signal that allows mobile computing device 120 to approximate the distance of device 110 relative to mobile computing device 120. For example, device 110 may be transmit an RF signal in minute, hourly, and/or daily increments, as determined by the low power mode operating parameters set at device management system 140 and/or mobile computing device 120. Intermittent transmission of the signal may allow device 110 to conserve battery power and limit the need to change the batteries or exchange device 110 for another while the tracked object is stationary.

Communication interface 112 may also receive instructions from mobile computing device 120 and/or device management system 140 to illuminate LEDs 114. In some embodiments, LEDs 114 may be used to visually broadcast the location of device 110 within the physical area of tracking system 100. For example, while device 110 is stationary it may be transmitting an RF signal including an ID for device 110 via BLE. The signal transmitted from device 110 may be received by a nearby mobile computing device 120. Mobile computing device 120 may use the received signal to approximate the distance of device 110 from mobile computing device 120. Additionally, visually broadcasting the location of device 110 and the tracked object may provide faster identification among tracked objects in a small area within the physical area of tracking environment 100. Communication interface 112 may receive an instruction to illuminate LEDs 114 to allow a user to visually identify the location of device 110 and the associated tracked object. LEDs 114 may be illuminated in a single color, multi-color, and/or strobing pattern. LEDs 114 may have red-blue-green (RBG) color options and/or a combination of RBG colors to for additional illumination color options. In some embodiments, different illumination colors and patterns may be associated with an indication to the user on the location of device 110 and/or the associated tracked object, to provide additional visual information to the user. Device management system 140 may track the corresponding color and pattern indications. For example, device management system 140 may transmit an illumination instruction to device 110 via network 130. The instruction may direct device 110 to illuminate LEDs 114 to illuminate red in a strobing pattern. A red strobing pattern may have a different meaning than a solid red pattern or a solid blue pattern. In some embodiments, device management system 140 directly transmit the instruction or may first transmit the instruction to mobile computing device 120 via network 130 and mobile computing device 120 may relay the instruction to device 110 via network 120 or directly through communication interface 112. An instruction may also be initiated at mobile computing device 120 by a user and transmitted to device 110.

In some embodiments, device 110 may supplement visual and location based tracking with a speaker. For example, the instruction may include, in addition to an instruction to illuminate LEDs 114 in a specified color and/or pattern, an instruction to produce an audible sound from the speaker. This may allow the user to have three methods to locate user device 110 and the tracked object. The various methods of identifying the location of device 110 may be used in different combinations suitable to the type of tracking environments. Additionally, various users may be visually and/or hearing impaired and the location-identifying mechanisms may make device 110 accessible to more users.

Device 110 may include environmental sensors 116. Environmental sensors 116 may include an accelerometer and ambient light sensor. The accelerometer may determine when device 110 is in motion or stationary. The movement of device 110, as determined by the accelerometer, may indicate whether communication interface should be operating using an ultra-wideband or Bluetooth low energy communication protocol. For example, device 110 may be placed on the tracked object when it arrives at the physical storage location for a set of tracked objects. The physical storage location may represent the physical area of tracking environment 100. Device 110 and the tracked object may be moved to a temporary, semi-permanent, or permanent storage location. While device 110 and the tracked object are moving with the physical area, communicating interface 112 may be transmitting a signal using the UWB communication protocol. In some embodiments, the signal may be an RF pulse. Mobile computing device 120 may act as an anchor and use its own location/position information and received signal to triangulate the position of device 110. When device 110 is moved to the storage location, the accelerometer may measure a change in velocity followed by a zero input indicating a rest position. The rest position indicates device 110 is stationary and communication interface 112 should use the BLE communication protocol. Likewise, when device 110 and the tracked object 110 are moved, the accelerometer may register a change in velocity that may indicate device 110 is moving and communication interface should use the UWB communication protocol.

In some embodiments, when the accelerometer indicates device 110 is stationary and communication interface 112 is using the BLE communication protocol to transmit a signal with identification information regarding the device. Device 110 may also be in low power mode, as described above. Additionally, the wrong tracked object and corresponding device may be moved in the physical area of tracking environment 100. The accelerometer may detect the movement and device 110 may go from a low power operating state to a higher power operating state. Device management system 140 may determine, based on the signal transmitted by device 110 and received by mobile computing device 120 using UWB, the incorrect tracked object and device 110 are being moved. Device management system 140 send an alert, through device 110 and/or mobile computing device 120 that the incorrect tracked object and device 110 are being moved.

In addition to intermittent signal transmission in low power mode, device 110 may use an ambient light sensor to determine the strength of illumination for LEDs 114. For example, the ambient light sensor may detect that it is dark at the location of device 110. LEDs 114 may not illuminate or strobe at full power while ambient light sensor detects a darker environment. This allows device 110 to continue to converse power and extend the lifetime of the batteries of the device. In some embodiments, the strength of illumination may be a spectrum, with the strongest, or brightest, illumination occurring when the ambient light sensor detects a bright environment, and weakest, or most dim, illumination when the ambient light sensor detects a dark environment. The user of mobile computing device 120 may override the instruction regarding illumination strength determined by the ambient light sensor by sending a different instruction from mobile computing device 120.

Mobile computing device 120 may be a smart phone, smart watch, laptop or notebook computer, netbook, tablet, personal digital assistant (PDA), and/or other mobile communication devices which are wearable or portable. Mobile computing device 120 may be operated by a user within the physical area of tracking environment 100. As mobile computing device 120 is moved throughout tracking environment 100, it is communicating with device 110. When using an UWB communication protocol, the precise location of device 110 is determined by tracking the time it takes for radio pulses to travel between mobile computing device 120 and device 110. While device 110 is stationary and using the BLE communication protocol, the BLE beacon is transmitted to mobile computing device 120. Mobile computing device 120 communicates the determined location information of device 110 based its own location data and the signal received from device 110 to device management system 140. In some embodiments, mobile computing device 120 may use an application and/or an application programming interface (API) that includes services, libraries, code, a combination thereof, and/or the like. The application may allow the user to interact with mobile computing device 120 and provide inputs or instructions that may be transmitted to device management system 140 via network 130 and/or device 110 directly to communication interface 112 or via network 130.

Device management system 140 manages device 110, mobile computing device 120, and the tracked object. As described in further detail in FIG. 2, tracking environment 100 may include multiple mobile computing devices 120, devices 110, and or tracked objects. Device management system 140 may manage the multiple devices in tracking environment 100 and/or their interactions with each other. Device management system 140 may be a software development kit (SDK) developed specifically for use with device 110 and mobile computing system. In some embodiments, device management system may be an SDK which device 110 and mobile computing device 120 are compatible. Device management system may include application programming interfaces (APIs), code, libraries, and process to facilitate the management of device 110 and mobile computing device 120 and the tracked object.

The tracking environment 100 may include a network 130. Network 130 may be a wireless network and/or a combination of wired and wireless networks. For example, network 130 may include a packet-switched network (e.g., internet protocol-based network), a non-packet switched network (e.g., quadrature amplitude modulation-based network), and/or the like. According to some aspects of this disclosure, network 130 may include network adapters, switches, routers, modems, and the like connected through wireless links (e.g., radiofrequency, satellite) and/or physical links (e.g., fiber optic cable, coaxial cable, Ethernet cable, or a combination thereof). According to some aspects of this disclosure, network 130 may include public networks, private networks, wide area networks (e.g., Internet), local area networks, and/or the like. According to some aspects of this disclosure, network 130 may provide and/or support communication from a telephone, cellular phone, modem, and/or other electronic devices associated with mobile computing device 120 and device management system 140 and throughout the tracking environment 100. For example, tracking environment 100 may include and support communications between device management system 140 and mobile computing device 120 via network 130.

Figure 2:
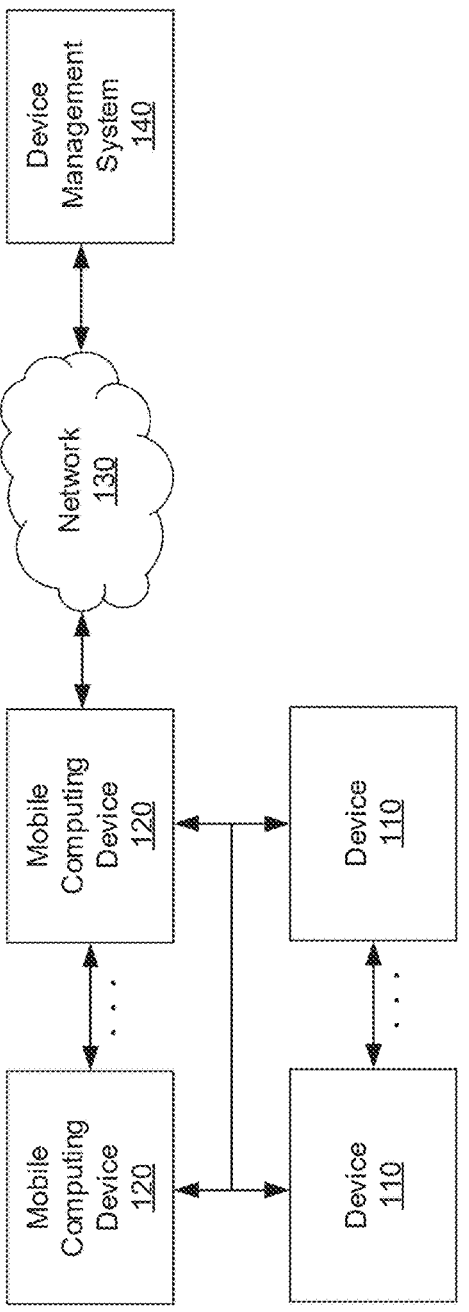
FIG. 2 depicts a block diagram illustrating a tracking environment containing multiple devices and mobile computing devices, according to some embodiments.

FIG. 2 depicts a block diagram illustrating tracking environment 200 for a tracking environment that includes multiple mobile computing devices 120 and multiple device 110 placed on different tracked objects. FIG. 2 shall be described with reference to FIG. 1; however, FIG. 2 is not limited to that example embodiments.

In an embodiment, device management system 140 may manage devices 110 and the corresponding tracked objects. Device management system 140 may communicate with devices 110 through mobile computing devices 120 via network 130. In some embodiments, device management system 140 store the identifying information for devices 110 and tracked objects. Additionally, device management system 140 may store information regarding the whether devices 110 is actively placed on a tracked object, which tracked object, the location of device 110 and the tracked objects. If device 110 is not assigned to a tracked object, device management system may provide instruction to place one of the multiple devices 110 on a tracked object. In some embodiments, device management system 140 may receive and store information associating a device 110 and a tracked object. For example, when tracking environment 100 is a shipping and storage environment, a tracked object may enter the physical area of tracking environment 100. A device 110 may be placed on the tracked object. Device management system 140 may communicate an instruction on which device to place on tracked the tracked object. Alternatively, the user of mobile computing device 120 may use the NFC tap-to-pair function to select a device 110 and then place it on the tracked object. When device 110 is paired with mobile computing device 120, identifying information corresponding to device 110 may be communicated from mobile computing device 120 to device management system 140 along with identifying information regarding the tracked object. Device management system 140 may store the identifying information of both device 110 and the tracked object and an indication device 110 is placed on the specific tracked object.

In some embodiments, the users of the multiple mobile computing devices 120 may be moving throughout the physical area of tracking environment 100. As mobile computing devices 120 are moved throughout the physical area, devices 110 that are moving are communicating their location using UWB. The more mobile computing devices 120 that are in the physical area of tracking environment 120, the more precise the UWB location tracking may be for devices 110.

Figure 3A:
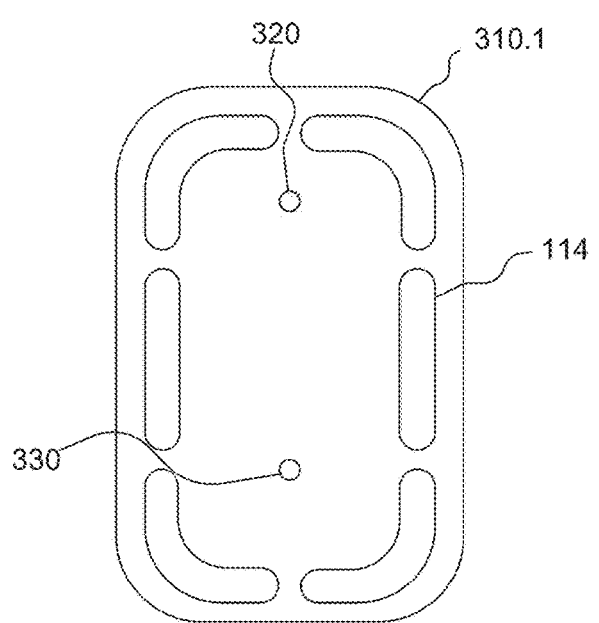
FIG. 3A depicts an illustration of the front profile of a physical structure of the device, according to some embodiments.
Figure 3B:
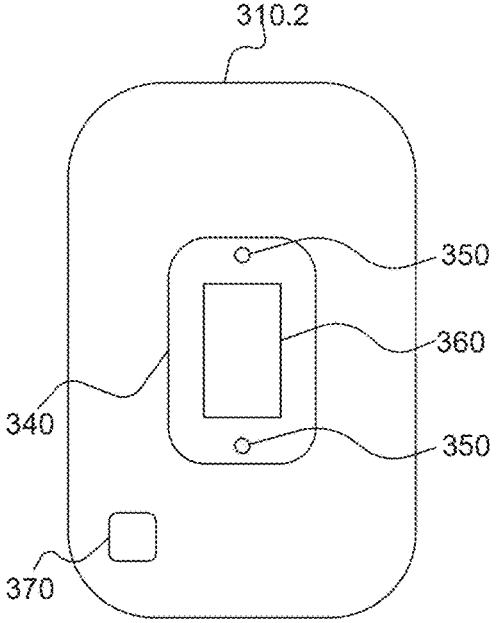
FIG. 3B depicts an illustration of the back profile of a physical structure of the device, according to some embodiments.
Figures 3C, 3D, 3E:
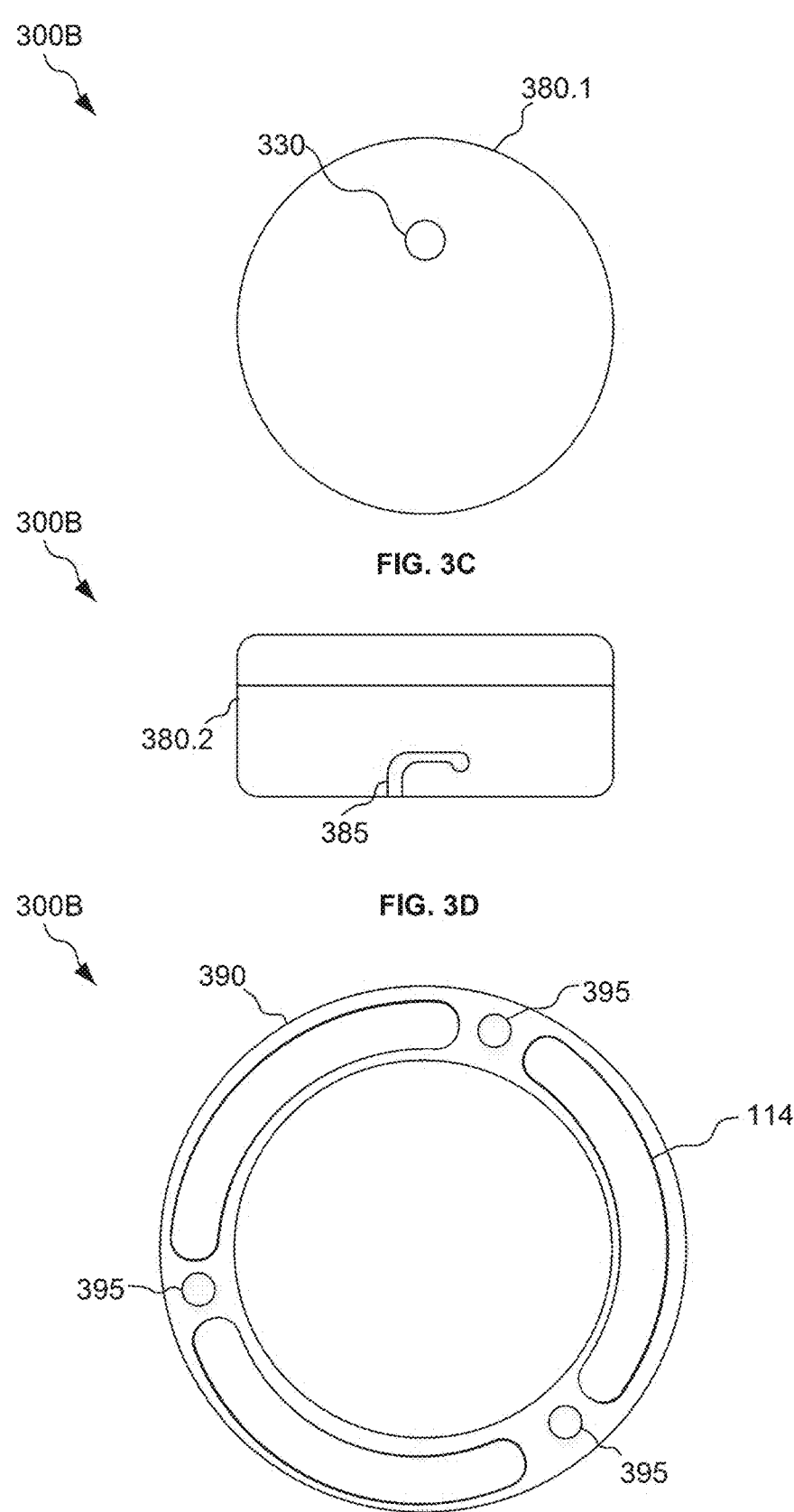
FIG. 3C depicts an illustration of the top profile of a physical structure of the device, according to some embodiments.
FIG. 3D depicts an illustration of the side profile of a physical structure of the device, according to some embodiments.
FIG. 3E depicts an illustration of the a base frame of the physical structure of the device, according to some embodiments

FIG. 3 depicts an illustration of the physical embodiment of device 110. FIGS. 3A and 3B may depict an embodiments of the front and back of the physical structure 300A of device 110. FIGS. 3C, 3D, and 3E may depict an additional physical structure 300B of device 110 using an additional method for placement. Common elements of FIGS. 3A-E may operate the same in both physical structures, unless otherwise disclosed. The physical structures of FIG. 3 shall be described with reference to FIG. 1; however, physical structure 300A/B are not limited to that example embodiment.

Referring to FIG. 3A physical structure 300 includes a housing 310, status light 320, ambient light sensor 330, and LEDs 114. Housing 310 may include a front portion 310.1 illustrated in FIG. 3A and a back portion 310.2 illustrated in FIG. 3B. Housing 310 may be made out of a material that allows physical structure 300 to withstand impacts and have protection from water and dust. Housing 300 may be rectangular in form, such as in physical structure 300A, but other shapes may be used and or appropriate depending on the type of tracking environment and tracked objects. In some embodiments the design and material of housing 310 may be in accordance with industry standards for impact, water, and dust resistance, such as drop performance industry standards. For example, MIL-STD-810G standard (military standard) for drop performance and IP67 (ingress protection) per IEC 60529 for splash, water, and dust protection. Front portion 310.1 of housing 310 may include LEDs 114. In some embodiments, LEDs 114 may surround the perimeter of housing. LEDs 114 may be a single LED or multiple LEDs in various locations on front portion 310.1 to allow device 110 to illuminate and visually broadcast the location of device 110 when prompted by mobile computing device 120 and/or device management system 140.

Front portion 310.1 may include status light 320. Status light 320 may be an LED similar to LEDs 114. Status light 320 may provide a visual indication to the user of errors regarding device 110. If there is an error that may require device 110 to be reset by the user, status light 320 may illuminate or strobe to provide an indication of the error. Different errors or statuses might be associated with different colors or illumination patterns. For example, status light 320 might illuminate a solid red color when the battery life is low. Status light 320 might illuminate in a different color and/or pattern to indicate device 110 may have an error and may be reset. Hardware for status light 320 may be located inside housing 310 of physical structure 300 to protect status light 320 from damage due to impact, dust, and/or water.

Front portion 310.1 may also include ambient light sensor 330. As described in FIG. 1, ambient light sensor 330 may measure the available light in the area of device 110 and decrease or increase the strength of illumination of device 110. For example, ambient light sensor 330 may decrease the strength of illumination of device 110 overnight, when available light may be significantly decreased. When the available light is low, the surrounding area of device 110 is dark, less illumination in LEDs 114 may still provide an easily identifiable visual broadcast of the location of device 110. Ambient light sensor 330 may increase the strength of illumination of LEDs 114 In some embodiments, ambient light sensor 330 may also increase or decrease the strength of illumination of status light 320. Hardware for ambient light sensor 330 may be contained within housing 310 to protect the sensor from damage due to impact, dust, and/or water. Ambient light sensor 330 may measure the available light with respect to front portion 310.1 of physical structure 300.

Referring to FIG. 3B, physical structure 300A includes a back portion 310.2. Back portion 310.2 may include a removable cover 340, cover fasteners 350, a device fastener 350, and a reset button 370. Removable cover 340 may provide access to the battery that powers device 110. The battery may be rechargeable or replaceable so device 110 can be utilized beyond the life of the battery. Status light 330 may illuminate to indicate that the battery needs to be recharged and/or replaced for device 110. Fasteners 350 may allow removable cover 340 to be attached and detached from housing 310. Fasteners may be screws or a type of fastener that may allow removable cover 340 to be removed to access the internal components of housing 310, such as the battery.

Back portion 310.2 may include device fastener 360. Device fastener 360 may allow device 110 to be placed on the tracked object. Device fastener 360 may operate so that device 110 may be attached and detached from the tracked object and attached to a different tracked object, by the user. For example, device fastener 360 may be a metal clip that the user could clip onto a surface or strap of the tracked object. The tracked object may be a palette or trailer. Various fasteners may be appropriate for device fastener 360. For example, device fastener 360 may be a hook and loop fastener, such as Velcro, in the form of a strap or two hook and loop strips, one place on back portion 310.2 of device 110 and one placed on the tracked object.

In some embodiments, back portion 310.2 may also include reset button 370. Reset button 370 may be pushed by the user to reset device 110. In some embodiments, reset button 370 may be used to reset device 110 if device 110 has an error. For example, status light 330 may illuminate red to indicate to the user there is an error with device 110 and device 110 should be reset in order to clear the error. In some embodiments, reset button 370 may be used to reset device 110 when it is no longer tracking the corresponding tracked object. For example, when tracking environment 100 is a shipping and storage environment, device 110 may be placed on a palette or shipping trailer to track the location in a storage area. At some point, the palette or shipping trailer may be removed from the storage area and tracking environment 100. In this case, the user may remove device 110 and press reset button 370 to communicate to mobile computing device 120 and/or device management system 140 that device 110 has been reset and is no longer placed on the tracked object.

Referring to FIGS. 3C-3E, physical structure 300B may be an additional depiction of physical structure 300, which is the physical structure of device 110. Physical structure 300B may include a housing 380, a housing base 390, latching mechanism 385, and housing fastener 395, as well as common elements from FIGS. 3A and 3B including LEDs 114, status light 320, and ambient light sensor 330. Similarly to housing 310, the design and material of housing 380 and housing base 390 may be in accordance with industry standards for impact, water, and dust resistance, such as drop performance industry standards. For example, MIL-STD-810G standard (military standard) for drop performance and IP67 (ingress protection) per IEC 60529 for splash, water, and dust protection. Housing 380 and housing base 390 may be circular in shape, as depicted, but may also be rectangular in shape, as depicted in FIGS. 3A and 3B. In some embodiments, LEDs 114 may be located in housing base 390 while status light 320 and ambient light sensor 330 may be located in housing 380. In this case, both housing 380 and base 390 may have removable and/or rechargeable batteries to provide power for the individual structures. In some embodiments, LEDs 114 may surround the perimeter of housing base 390. LEDs 114 may be a single LED or multiple LEDs in various locations on housing base 390 to allow device 110 to illuminate and visually broadcast the location of device 110 when prompted by mobile computing device 120 and/or device management system 140.

Referring to FIGS. 3C and 3D, housing 380 may have an upper portion 380.1 and a lower portion 380.2. Upper portion 380.1 and lower portion 380.2 may be detachable from each other through a thread or snapping mechanism. For example, upper portion 380.1 and lower portion 380.2 may have thread that allow the user to screw and unscrew upper portion 380.1 and lower portion 380.2 from each other. The user may access internal portions of housing 380, such as to replace batteries. For housing 380 may fit into housing base using latching mechanism 385. Latching mechanism 385 may be a slotted indentation on the lower portion of 380.2. Housing base 390 may have a mirrored mirrored protrusion on the inner radius of housing base 390, which is in contact with housing 380 when they are slotted together by the user. For example, the user may place housing 380 in housing base 390 and turn housing 380 to latch the two together, using latching mechanism 385.

Referring to FIGS. 3E, housing base 390, may have housing fasteners 395 that allow housing base to be attached directly to the tracked object independent of housing 380. Housing base 390 may be attached using housing fasteners 395 such as screws, but also me more easily removably fasteners such as a hook and loop fastener, magnets, and/or a glue or sticky substance.

FIG. 4 depicts a flowchart illustrating method 400 for tracking the location of an object and providing visual and location based identification of the tracked object in tracking environment 100 by device 110. Method 400 shall be described with reference to FIG. 1; however, method 400 is not limited to that example embodiment.

In an embodiment, device 110 may be placed on a tracked object when the tracked object arrives in the physical area of tracking environment 100. Device 110 may transmit a signal to mobile computing device 120 and/or device management system 140 using ultra-wideband (UWB) or Bluetooth low energy (BLE) communication protocols. The signal may be used to triangulate the location of device 110 and the corresponding tracked object. Additionally, device 110 may receive instruction to illuminate LEDs 114 to so the user may visually identify the location of device 110.

At 410, device 110 transmits a signal containing identifying information to mobile computing device 120. Device 110 may use near-field (NFC) communication, or a tap-to-pair function, to connect and transmit the identifying information to mobile computing device 120. In some embodiments, the identifying information transmitted from device 110 to mobile computing device 120, is transmitted to device management system 140 via network 130. Device management system 140 may use the identifying information to assign device 110 to a tracked object within the device management system. 140. In some embodiments, along with information regarding device 110, mobile computing device 120 may transmit information regarding the tracked object, inputted by the user at mobile computing device 120. For example, when tracking environment 100 is a shipping and storage environment, the tracked object, such as a trailer containing product, may arrive at the physical storage area of tracking environment 100. Upon arrival, the user may select device 110 labeled "Device 30". The user may use NFC so that device 110 and mobile computing device 120 are paired and the identifying information of device 110, e.g. "device 30," is shared with mobile computing device 120. Additionally, at a user interface, the user may enter information regarding the tracked object, e.g. the trailer, such as a trailer number or information regarding the product or object inside the trailer. Device management system 140 may associate device 110 and the tracked object in the system. In some embodiments, once device 110 has been paired with mobile computing device 120, device 110 is placed on the tracked object using the device fastener 360 and/or housing base 390.

At 420, device 110 and the corresponding tracked object may be moved in the physical area of tracking environment 100. As device 110 in the physical area of tracking environment 100, a signal is transmitted from device 110 to mobile computing device 120 and/or device management system 140.

At 430, device 110 uses an ultra-wideband communication protocol to transmit a signal, (e.g. an RF pulse), to mobile computing device 120. Referring to FIG. 2, there may be multiple mobile computing devices 120 in tracking environment 100. While device 110 is moving throughout tracking environment 100, device 110 may a signal to multiple mobile computing devices 120 that are located through the physical area of tracking environment 100. This allows a precise location to be determined for the location of device 110 and the tracked object. The greater number of individual mobile computing devices 120 scattered throughout the physical area of tracking environment 100, the more precisely tracked the location of device 110 and the tracked object may be. In some embodiments, the UWB communication protocol allows device 110 to be precisely tracked for 30-50 meters. In some embodiments, mobile computing device 120 may transmit the determined location information to device management system 140 to store the location information for device 110 and the corresponding tracked object. As mobile computing devices 120 move throughout the environment, the location information for device 110 and corresponding tracked object may be updated in device management system 140.

At 440, once device 110 and the tracked object have reach a stationary location, device 110 may transmit the stationary location using a Bluetooth low energy (BLE) communication protocol. BLE may provide a more proximate location of device 110, compared to the precise location provided by UWB. In addition to transmitting using BLE, device 110 may operate in a low power mode when stationary, to conserve the battery life of device 110. Because device 110 is stationary and the location should not be change, the location of device 110 may be transmitted using BLE intermittently. For example, device 110 may transmit the location of the tracked object and the device to mobile computing device 120 and/or device management system 140, every few minutes, hour, or a daily transmission. Similar to 430, mobile computing device 120 may transmit the determined location information to device management system 140 to store the determined location information for device 110 and the tracked object.

At 450, device 110 may receive an instruction from mobile computing device 120 and/or device management system 140 to illuminate device 110 and visually broadcast the location of device 110 and the tracked object. Tracking environment 100 may include many devices 110 and tracked objects. In some embodiments, tracked objects may store very close or on top of each other so that location data may not be sufficient to quickly identify the tracked object corresponding to device 110. Additionally, tracked objects may be visually similar on the outside, but contain very different products or objects inside. Visually broadcasting the location of device 110 may allow the user to quickly identify device 110 and the desired tracked object. For example, when the tracked object is a trailer or shipping container, the objects inside the containers may be not be visible and some containers may be stored without objects inside. Additionally, they may be stored by being stacked on top of each other. The user may identify the proximate location of device 110 and the container based on the determined location information and a visually broadcasted location may allow the user to quickly identify the location of the desired device 110 and corresponding tracked object.

At 460, device 110 illuminates to visually broadcast the location of device 110. Device 110 may illuminate LEDs 114 in a single color, multiple colors, and/or a strobing pattern. The instruction received at 450 may contain illumination instructions regarding the color and strobing pattern. The user may indicate the desired color and/or strobing pattern at a user interface of mobile computing device. In some embodiments, device management system 140 may have a predetermined color and/or strobing pattern based on the corresponding tracked object of device 110. In some embodiments, ambient light sensor 330 may adjust the strength of illumination for LEDs 114, depending on the available light at device 110. For example, if the illumination instruction is sent at night, the available light may be reduced and ambient light sensor 330 may detect the reduced available light and reduce the illumination strength for LEDs 114.

In some embodiments, along with illuminating LEDs 114, device 110 may produce an audible sound from a speaker of device 110. Audible broadcasting may also be included in the instructions received at 450. Similar to the illumination instructions, the sound instruction may include a sound to broadcast by the speaker, a length of time to broadcast the sound, and/or a volume to broadcast the sound. User may have visual impairments and/or tracking environment 100 may have low visibility that make visually identifying the illuminated device 110 difficult and in those cases an audible broadcast may allow the user to quickly identify device 110 and the tracked object.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A non-transitory computer-readable device having instructions stored thereon that, when executed by at least one device, cause the at least one device to perform operations enabling location tracking of the device, and a corresponding tracked object, the operations comprising:

transmitting an identifying signal with identifying information of the device via near field communication, wherein the transmission allows the device to be registered to a corresponding tracked object;

transmitting a signal from the device, which can be used to triangulate the location of the device and the tracked object;

the transmitting including:

transmitting a first signal using an ultra wideband (UWB) communication protocol;

transmitting a second signal using a Bluetooth low energy (BLE) communication protocol;

receiving an instruction to illuminate the device to broadcast the location of the tracked object; and in response to the instruction, illuminating the device.

2. The operations of claim 1, wherein the device is in a low power operating state and stationary while transmitting second signal using the BLE communication protocol.

3. The operations of claim 1, wherein the transmitting the first signal occurs while the device is moving and further comprises entering the low power operating state when the device becomes stationary, wherein the operation of the device while in the low power operating state is reduced to transmitting and receiving signals, the signal transmitted being the second signal using the BLE communication protocol.

4. The operations of claim 1, wherein the transmitting the second signal occurs while stationary at predetermined intervals.

5. The operations of claim 1, wherein the receiving the instruction further comprises receiving an instruction to exit the low power operating state and enter a higher power operating state, enabling the device to illuminate and visually broadcast the location of the tracked object.

6. The operations of claim 1, further comprising:

receiving, from the system, an instruction to produce an auditory broadcast of the location of the device and the tracked object; and producing, by the device, an auditory broadcast of the location of the device and tracked object.

7. The operations of claim 1, wherein illuminating comprises producing a light using a red, blue, green (RGB) light-emitting diode (LED) in a specific pattern indicated in the received instruction.

8. A method for visual and location based tracking of a device and a corresponding tracked object comprising:

transmitting an identifying signal with identifying information of the device via near field communication, wherein the transmission allows the device to be registered to a corresponding tracked object;

transmitting the location of the device and the tracked object;

the transmitting including:

transmitting the location of the device, while the device is moving, using an ultra wideband (UWB) communication protocol;

transmitting the location of the device, while the device is stationary, using a Bluetooth low energy (BLE) communication protocol;

illuminating of the location of the device to broadcast the location of the tracked object; and in response to the instruction, illuminating the device.

9. The method of claim 8, wherein the device is in a low power operating state and stationary while transmitting second signal using the BLE communication protocol.

10. The method of claim 8, wherein transmitting the first signal while the device is moving further comprises entering the low power operating state when the device becomes stationary, wherein the operation of the device while in the low power operating state is reduced to transmitting and receiving signals, the signal transmitted being the second signal using the BLE communication protocol.

11. The method of claim 8, wherein transmitting the second signal while stationary occurs at predetermined intervals.

12. The method of claim 8, wherein receiving the instruction further comprises an instruction to exit the low power operating state and enter a higher power operating state, enabling the device to illuminate and visually broadcast the location of the tracked object.

13. The method of claim 8, further comprising:

receiving, from the system, an instruction to produce an auditory broadcast of the location of the device and the tracked object; and producing, by the device, an auditory broadcast of the location of the device and tracked object.

14. The method of claim 8, wherein producing the visual broadcast comprises producing a light using a red, blue, green (RGB) light-emitting diode (LED) in a specific pattern and indicated in the received instruction.

15. A device, comprising:

a housing, the housing comprising:

an attachment mechanism, configured to couple the device to a tracked object;

a communication system, configured to transmit the location of the device, comprising:

an ultra wideband (UWB) beacon; and a Bluetooth low energy (BLE) beacon;

a first set of light-emitting diodes (LEDs), configured to received instructions to produce a specified light pattern;

a second set of light-emitting diodes (LEDs), configured to produce light to indicate a status of the device;

an accelerometer; and an ambient light sensor, configured to conserve power by adjusting the brightness level of the first LED and the second LED.

16. The device of claim 15, the attachment mechanism further configured to removably couple the device to the tracked object by using a clip, a magnet, or an adhesive attachment mechanism.

17. The device of claim 15, further comprising a removable battery that can be replaced.

18. The device of claim 15, the attachment mechanism further comprising a removable base, wherein the removable base is configured to be coupled to the tracked object allowing the device to be coupled and decoupled from the tracked object.

19. The device of claim 15, further comprising a speaker, configured to produce sound and enable auditory tracking of the device and the tracked object the device is coupled to.

20. The device of claim 15, the housing further configured to cover internal electronic components of the device to protect the device from damage due to water and impact.

* * * * *